United States Patent
Lee

(10) Patent No.: US 11,929,846 B2
(45) Date of Patent: Mar. 12, 2024

(54) COMMUNICATION REDUNDANCY SYSTEM FOR AN AUTONOMOUS VEHICLE

(71) Applicants: HYUNDAI MOTOR COMPANY, Seoul (KR); KIA MOTORS CORPORATION, Seoul (KR)

(72) Inventor: Young Seop Lee, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 296 days.

(21) Appl. No.: 17/219,357

(22) Filed: Mar. 31, 2021

(65) Prior Publication Data

US 2022/0141049 A1 May 5, 2022

(30) Foreign Application Priority Data

Nov. 3, 2020 (KR) .......................... 10-2020-0144869

(51) Int. Cl.
*H04L 12/40* (2006.01)
*G07C 5/08* (2006.01)
*H04L 43/0817* (2022.01)

(52) U.S. Cl.
CPC ............ *H04L 12/40* (2013.01); *G07C 5/0816* (2013.01); *H04L 43/0817* (2013.01); *H04L 2012/40273* (2013.01)

(58) Field of Classification Search
CPC ................. H04L 12/40; H04L 43/0817; H04L 2012/40273
USPC ........................................................ 709/224
See application file for complete search history.

(56) References Cited

U.S. PATENT DOCUMENTS

| | | | |
|---|---|---|---|
| 2018/0295147 A1* | 10/2018 | Haga | H04L 12/40006 |
| 2019/0141070 A1* | 5/2019 | Tsurumi | B60R 1/00 |
| 2021/0031792 A1* | 2/2021 | Hasegawa | G06F 11/0739 |
| 2021/0105174 A1* | 4/2021 | Pandey | H04L 67/12 |
| 2021/0123986 A1* | 4/2021 | Kagaya | G06F 13/4282 |

* cited by examiner

*Primary Examiner* — Meng Vang
(74) *Attorney, Agent, or Firm* — Lempia Summerfield Katz LLC

(57) ABSTRACT

A communication redundancy system for an autonomous vehicle includes: a vehicle network domain including a bus configured to transmit a signal, terminal end resistors disposed at both ends of the bus, and a plurality of electronic control units (ECUs) connected to the bus; a plurality of gateways connected to the vehicle network domain; and a high-level ECU connected to the plurality of gateways and configured to control the plurality of ECUs to implement autonomous driving of a vehicle. Each of the plurality of gateways detects disconnection of the bus in the vehicle network domain and, when the disconnection of the bus is detected, the plurality of gateways transmit pieces of data of the plurality of ECUs to the high-level ECU.

15 Claims, 4 Drawing Sheets

COMMUNICATION REDUNDANCY SYSTEM FOR AN AUTONOMOUS VEHICLE

CROSS-REFERENCE TO RELATED APPLICATION

This application claims under 35 U.S.C. § 119(a) the benefit of priority to Korean Patent Application No. 10-2020-0144869 filed on Nov. 3, 2020, the entire contents of which are incorporated herein by reference.

BACKGROUND

(a) Technical Field

The present disclosure relates to a communication redundancy system for an autonomous vehicle in which redundancy is applied to an autonomous driving system using two gateways.

(b) Background Art

In order to implement autonomous driving of a vehicle, a large number of electronic control units (ECUs) are applied to vehicles when compared to the existing vehicles. Thus, reliability and redundancy of data transmission/reception between ECUs are emerging as important research and development subjects. In particular, in order to secure stability of an autonomous vehicle, redundancy is important in a communication network.

For precise control of a vehicle, an autonomous driving system employs a gateway for selecting and routing information necessary for monitoring various data from a vehicle network. In general, two gateways are employed for redundancy of the communication network.

In a redundancy system to which two gateways are applied, communication failures due to communication errors and errors of ECUs can be solved. However, when disconnection occurs in a bus connecting ECUs, even when the two gateways are applied, there occurs a problem that pieces of data output from some of the ECUs cannot be transmitted to a high-level ECU. In addition, even in data exchange between the ECUs, there occurs a problem that pieces of data output from some of the ECUs cannot be transmitted to other ECUs.

SUMMARY OF THE DISCLOSURE

The present disclosure has been made in an effort to solve the above-described problems associated with prior art.

In one aspect, the present disclosure provides a communication redundancy system for an autonomous vehicle, in which a normal communication network is capable of being implemented even in disconnection of a bus.

In another aspect, the present disclosure provides a communication redundancy system for an autonomous vehicle in which, even in disconnection of a bus, pieces of data output from all electronic control units (ECUs) are capable of being transmitted to a high-level ECU and pieces of data output from the ECUs are capable of being transmitted to other ECUs.

Objectives of the present disclosure are not limited to the above-described objectives. Other objectives of the present disclosure, which are not mentioned, can be understood by the following description and also can be apparently understood through embodiments of the present disclosure. Further, the objectives of the present disclosure can be implemented by means described in the appended claims and a combination thereof.

In an embodiment, the present disclosure provides a communication redundancy system for an autonomous vehicle. The communication redundancy system for an autonomous vehicle includes a vehicle network domain including a bus configured to transmit a signal, terminal end resistors disposed at both ends of the bus, and a plurality of electronic control units (ECUs) connected to the bus. The system further comprises a plurality of gateways connected to the vehicle network domain, and a high-level ECU connected to the plurality of gateways and configured to control the plurality of ECUs to implement autonomous driving of a vehicle. Each of the plurality of gateways detects disconnection of the bus in the vehicle network domain. When the disconnection of the bus is detected, the plurality of gateways transmit pieces of data of the plurality of ECUs to the high-level ECU.

According to one embodiment, each of the plurality of gateways may be connected between the terminal end resistor and an ECU closest to the terminal end resistor.

According to one embodiment, each of the plurality of gateways may further include: a communication ECU configured to control a communication signal; a transceiver connected to the bus including a high line and a low line and configured to transmit signals output from the plurality of ECUs to the communication ECU; and a disconnection detector connected to the bus and configured to detect a potential difference between the high line and the low line of the bus.

According to one embodiment, the vehicle network domain may include a plurality of connectors connected to the bus. The communication ECU may determine disconnection of the plurality of connectors on the basis of the potential difference.

According to one embodiment, each of the plurality of gateways may further include a terminal end resistance correction part connected to the bus and configured to compensate for a resistance value, which is varied due to disconnection of the bus.

According to one embodiment, when the disconnection is determined as being occurring in the bus, the communication ECU may turn the terminal end resistance correction part on.

According to one embodiment, the terminal end resistance correction part may include a switch and a compensation resistor, and when the disconnection occurs in the bus, the communication ECU may turn the switch on to connect the compensation resistor to the bus.

According to one embodiment, the compensation resistor may have a resistance value equal to that of the terminal end resistor.

According to one embodiment, when the disconnection occurs in the bus, the plurality of gateways may mutually transmit pieces of data of the ECUs, which are received by the plurality of gateways. Each of the plurality of gateways may transmit the pieces of data of the ECUs, which are received from the remaining gateways, to the vehicle network domain.

According to one embodiment, the plurality of gateways may include a first gateway and a second gateway, when a communication error of the first gateway is detected, the first gateway may transmit a first signal to the high-level ECU. The first signal may be a signal indicating a failure mode in which the first gateway does not route the first signal normally due to the communication error of the first gateway.

According to one embodiment, when the first signal is received, the high-level ECU may transmit a second signal to the first gateway and the second gateway. The second signal may be a signal for instructing data transmitted from the vehicle network domain to be routed to the high-level ECU through the second gateway in which the communication error does not occur.

According to one embodiment, when any signal including the first signal is not received from the first gateway, the high-level ECU may transmit the second signal to the first gateway and the second gateway.

According to one embodiment, the plurality of gateways may include a first gateway and a second gateway, when the disconnection of the bus of the vehicle network domain is detected, the first gateway may transmit a third signal to the high-level ECU. The third signal may be a signal indicating a failure mode in which the disconnection occurs in the bus of the vehicle network domain.

According to one embodiment, when the third signal is received, the high-level ECU may transmit a fourth signal to the first gateway and the second gateway. The fourth signal may be a signal for instructing the first and second gateways to simultaneously route data received from the vehicle network domain to the high-level ECU and to transmit the data routed between the first and second gateways again to the vehicle network domain.

According to one embodiment, when the disconnection occurs in the bus, each of the first gateway and the second gateway may route a signal for controlling different ECUs.

According to one embodiment, the data received by each of the first gateway and the second gateway may mean pieces of data output from different ECUs. The first gateway and the second gateway may mutually transmit the pieces of data received by each of the first gateway and the second gateway. Each of the first gateway and the second gateway may transmit the pieces of data, which are received from a counterpart of the first gateway or the second gateway, to the vehicle network domain.

Other aspects and specific embodiments of the present disclosure are discussed below.

It should be understood that the terms "vehicle" or "vehicular" or other similar terms as used herein include motor vehicles in general such as: passenger automobiles including sports utility vehicles (SUV), buses, and trucks; various commercial vehicles; watercraft including a variety of boats and ships; aircraft; and the like, and include hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example vehicles that are both gasoline-powered and electric-powered.

The above and other features of the present disclosure are discussed below.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus do not limit the present disclosure, and wherein.

Figure 1:
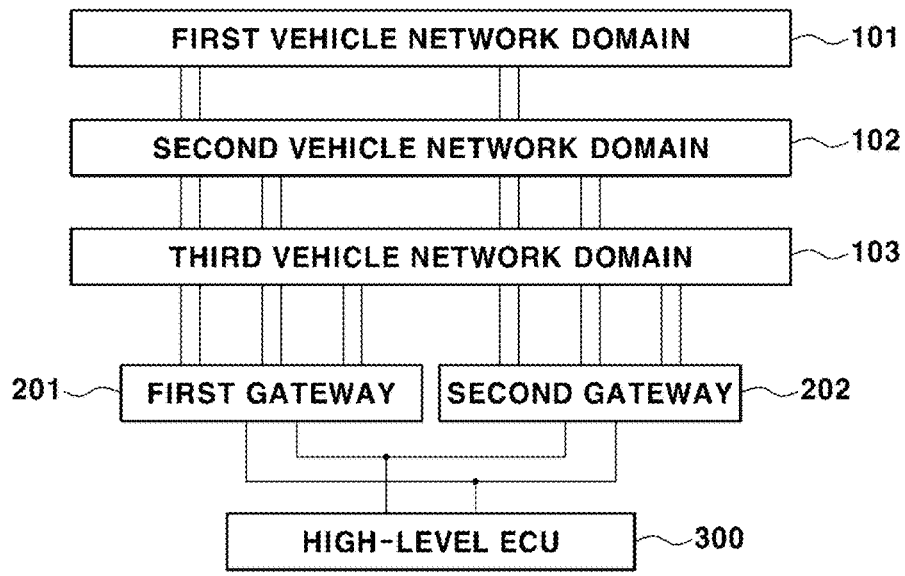
FIG. 1 is a diagram illustrating a communication redundancy system for an autonomous vehicle according to an embodiment of the present disclosure.

It should be understood that the appended drawings are not necessarily to scale, presenting a somewhat simplified representation of various features illustrating the basic principles of the present disclosure. The specific design features of the present disclosure as disclosed herein, including, for example, specific dimensions, orientations, locations, and shapes should be determined in part by the particular intended application and use environment.

In the figures, identical reference numbers refer to the same or equivalent parts of the present disclosure throughout the several figures of the drawing.

DETAILED DESCRIPTION

The advantages and features of the present disclosure and a manner for achieving them should become apparent with reference to the embodiments described in detail below together with the accompanying drawings. The present disclosure may, however, be implemented in many different forms and should not be construed as being limited to the embodiments set forth herein. The embodiments are provided such that this disclosure is thorough and complete and fully conveys the scope of the present disclosure to those having ordinary skill in the art. The present disclosure is defined by only the scope of the appended claims. The same reference numerals refer to the same or equivalent components throughout this disclosure.

Further, the terms "~part," "~unit," "~module," or the like used herein mean a unit for processing at least one function or operation, and this unit may be implemented by hardware, software, or a combination of hardware and software. When a part, a unit, a module, or the like of the present disclosure is described as having a purpose or performing an operation, function, or the like, the part, the unit, the module, or the like should be considered herein as being "configured to" meet that purpose or to perform that operation, function, or the like. Further, the controller described herein may include a processor programmed to perform the noted operation, function, operation, or the like.

Further, in the present specification, the terms "a first," "a second," and the like are assigned to components so as to differentiate these components because names of the components are otherwise the same, but these terms are not necessarily limited to the order in the following description.

The following detailed description illustrates the present disclosure. Further, the following is intended to illustrate and describe specific embodiments of the present disclosure, and the present disclosure may be used in various other combinations, modifications, and environments. In other words, it is possible to practice alternations or modifications without departing from the scope of the present disclosure disclosed herein, equivalents, and/or within the technical or knowledge scope in the art to which the present disclosure pertains. The described embodiments are intended to illustrate the best mode for carrying out the technical spirit of the present disclosure and various modifications can be made in the specific applications and uses of the present disclosure. Therefore, the detailed description of the present disclosure is not intended to limit the present disclosure to the disclosed embodiments. Further, it should be construed that the appended claims are intended to include other embodiments.

FIG. 1 is a diagram illustrating a communication redundancy system for an autonomous vehicle according to an embodiment of the present disclosure.

Referring to FIG. 1, the communication redundancy system for an autonomous vehicle may be implemented with a plurality of vehicle network domains 101, 102, and 103, a plurality of gateways 201 and 202, and a high-level electronic control unit (ECU) 300. Autonomous driving may mean automatic driving to a given destination by self-recognizing a road environment, determining a driving situation, and controlling a vehicle according to a planned driving route.

The vehicle network domains 101, 102, and 103 may be components for connecting a plurality of ECUs through a bus and implementing a communication network between the plurality of ECUs and a communication network between the plurality of ECUs and a high-level ECU. A control area network (CAN) communication network or a control area network-flexible data rate (CAN-FD) communication network may be applied as the communication network. The vehicle network domains 101, 102, and 103 may transmit signals output from the plurality of ECUs to the gateways 201 and 202 and transmit signals received from the gateways 201 and 202 to the ECUs.

The gateways 201 and 202 may serve to route the signals transmitted from the vehicle network domains 101, 102, and 103. The gateways 201 and 202 may serve to transmit the signals received from the plurality of vehicle network domains 101, 102, and 103 to the high-level ECU 300 and transmit the signals received from the high-level ECU 300 to the plurality of vehicle network domains 101, 102, and 103. In general, the gateways 201 and 202 may be provided as one gateway but, in another embodiment of the present disclosure, two gateways 201 and 202 may be provided.

The high-level ECU 300 is a component for implementing an autonomous driving system and may mean an ECU for controlling a plurality of ECUs such as hybrid ECUs (HCUs) or vehicle ECUs (VCUs). In other words, the high-level ECU 300 may output signals for controlling a plurality of ECUs included in the vehicle network domains 101, 102, and 103.

For example, the high-level ECU 300 may implement an autonomous driving system including functions such as road boundary departure prevention systems (RBDPS), cooperative adaptive cruise control systems (CACC), vehicle/roadway warning systems, partially automated parking systems (PAPS), partially automated lane change systems (PALS), cooperative forward vehicle emergency brake warning systems (C-FVBWS), lane departure warning systems (LDWS), pedestrian detection and collision mitigation systems (PDCMS), curve speed warning systems (CSWS), lane keeping assistance systems (LKAS), adaptive cruise control systems (ACC), forward vehicle collision warning systems (FVCWS), maneuvering aids for low speed operation systems (MALSO), lane change decision aid systems (LC-DAS), low speed following systems (LSF), full speed range adaptive cruise control systems (FSRA), forward vehicle collision mitigation systems (FVCMS), extended range backing aids systems (ERBA), cooperative intersection signal information and violation warning systems (CIWS), and traffic impediment warning systems (TIWS).

Figure 2:
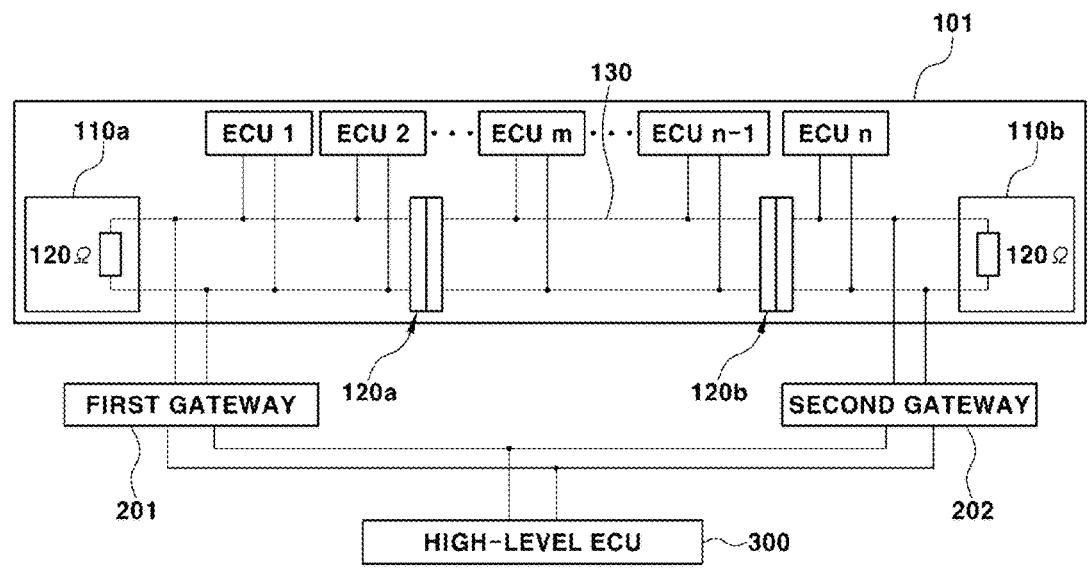
FIG. 2 is a diagram for describing a communication network of the communication redundancy system for an autonomous vehicle according to the embodiment of the present disclosure.
Figure 3:
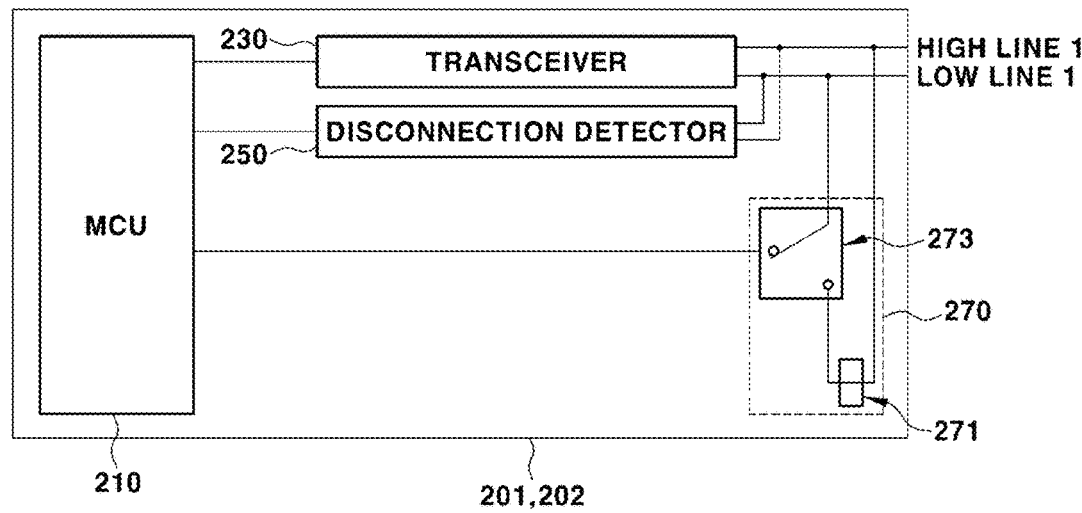
FIG. 3 is a diagram illustrating a gateway according to the embodiment of the present disclosure.

FIG. 2 is a diagram for describing a communication network of the communication redundancy system for an autonomous vehicle according to the embodiment of the present disclosure, and FIG. 3 is a diagram illustrating a gateway according to the embodiment of the present disclosure. FIGS. 2 and 3 are diagrams for describing a communication network among a first vehicle network domain, gateways, and a high-level ECU.

Referring to FIGS. 2 and 3, a first vehicle network domain 101 may include the plurality of ECU-1 to ECU-n, a bus 130 for CAN communication or CAN-FD communication between the plurality ECU-1 to ECU-n, and a plurality of connectors 120a and 120b disposed on the bus 130. The ECU-1 to ECU-n may be components for electronically controlling components of a vehicle for autonomous or ordinary driving of the vehicle.

The bus 130 may include a high line and a low line for transmitting signals output from and received by the ECU-1 to ECU-n. Terminal end resistors 110a and 110b may be disposed at both ends of the bus 130. For example, each of the terminal end resistors 110a and 110b may have resistance of 120 ohms. The connectors 120a and 120b may be used to connect lines constituting the bus 130.

The gateways 201 and 202 may include a first gateway 201 and a second gateway 202. The gateways 201 and 202 may be connected between the terminal end resistors 110a and 110b and the ECU-1 and the ECU-n which are closest thereto. Specifically, the first gateway 201 may be disposed between the first terminal end resistor 110a and the ECU-1, and the second gateway 202 may be disposed between the second terminal end resistor 110b and the ECU-n. In other words, the ECU-1 and the ECU-n may not be connected between the gateways 201 and 202 and the terminal end resistors 110a and 110b. Each of the first gateway 201 and the second gateway 202 may include a communication main control unit (MCU) 210, a transceiver 230, a disconnection detector 250, and a terminal end resistance correction part 270.

Each of the first and second gateways 201 and 202 may detect disconnection of the bus 130 of the vehicle network domains 101, 102, and 103. When the disconnection of the bus 130 is detected, the first and second gateways 201 and 202 may transmit pieces of data of the plurality of ECU-1 to ECU-n to the high-level ECU 300. In a normal situation, the plurality of ECU-1 to ECU-n and the high-level ECU 300 may communicate with each other through only one of the gateways 201 and 202. However, when the disconnection of the bus 130 occurs, the plurality of ECU-1 to ECU-n and the high-level ECU 300 may communicate with each other through the two gateways 201 and 202.

The communication MCU 210 may control a communication signal. Specifically, the communication MCU 210 may control transmission of signals (or pieces of data) through the bus 130 and analyze the signals received through the ECU-1 to ECU-n, thereby determining errors of the ECU-1 to ECU-n and a short circuit of the bus 130.

The transceiver 230 may be connected to the bus 130 including the high line and the low line to transmit signals output from the ECU-1 to ECU-n to the communication MCU 210.

The disconnection detector 250 may be connected to the bus 130 to detect a potential difference between the high line and the low line of the bus 130. Generally, the disconnection detector 250 may detect synthetic resistance of 60 ohms by means of the two terminal end resistors 110a and 110b. However, when the disconnection occurs in the bus 130, the disconnection detector 250 may detect a resistance value different from 60 ohms. A case in which the disconnection occurs in the bus 130 may mean that a break-off of the connectors 120a and 120b is generated. For example, when a break-off occurs in one of the connectors 120a and 120b, the disconnection detector 250 may detect a resistance value of 120 ohms. The communication MCU 210 may determine disconnection of connectors 120a and 120b on the basis of the resistance value detected by the disconnection detector 250 and a potential difference of the bus 130 (a potential difference between the high line and the low line) according to a variation of the resistance value.

The terminal end resistance correction part 270 may be connected to the bus 130 and the communication MCU 210 to compensate for a resistance value, which is varied due to the disconnection of the bus 130. The terminal end resistance correction part 270 may include a compensation resistor 271 and a switch 273. For example, the compensation resistor 271 may have the same resistance as the terminal end resistors 110a and 110b. In other words, the compensation resistor 271 may have resistance of 120 ohms. When the disconnection of the bus 130 is determined as occurring, the communication MCU 210 may turn the switch 273 on. As the switch 273 is turned on, the compensation resistor 271 is connected to the terminal end resistors 110a and 110b in parallel. Thus, when a break-off occurs in any one of the connectors 120a and 120b, the terminal end resistance correction part 270 is turned on so that the synthetic resistance of the bus 130 may maintain resistance of 60 ohms. In other words, even when the break-off occurs in any one of the connectors 120a and 120b, a potential difference between the high line and the low line which constitute the bus 130 may not be varied. Thus, communication instability such as occurrence of an error frame due to a variation in potential difference between the two high and low lines of the bus 130 may be solved.

Figure 4:
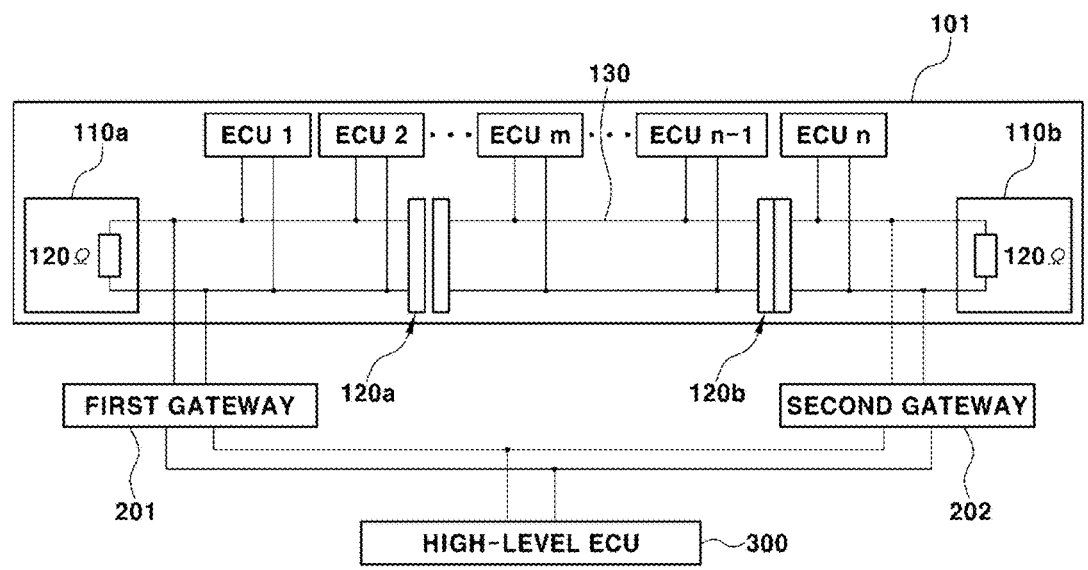
FIG. 4 is a diagram for describing disconnection of a bus according to one embodiment of the present disclosure.

FIG. 4 is a diagram for describing disconnection of a bus according to one embodiment of the present disclosure. FIG. 4 is a diagram for describing a control strategy of the gateways 201 and 202 when the first connector 120a is broken off.

Referring to FIGS. 1 and 4, the disconnection of the bus 130 may mean the break-off of the connectors 120a and 120b. In the present embodiment, a case in which the first connector 120a is broken-off is described.

When the first connector 120a is broken off, the first gateway 201 may determine that the first connector 120a is broken off on the basis of the potential difference of the bus 130. When the first connector 120a is broken off, signals output from the ECU-1 and the ECU-2 which are connected between the first connector 120a and the first terminal end resistor 110a cannot be transmitted to the second gateway 202. In addition, signals output from the ECUs (excluding the ECU-1 and the ECU-2) connected between the first connector 120a and the second terminal end resistor 110b cannot be transmitted to the first gateway 201. According to an embodiment of the present disclosure, the first gateway 201 may transmit signals output from the ECU-1 and the ECU-2 to the high-level ECU 300 and transmit a command signal from the high-level ECU 300 to the ECU-1 and the ECU-2. In addition, the second gateway 202 may transmit the signals output from the ECUs excluding the ECU-1 and the ECU-2 to the high-level ECU 300 and transmit the command signal from the high-level ECU 300 to the ECUs excluding the ECU-1 and the ECU-2. In other words, a phenomenon in which signals of some of the ECUs are not transmitted to the high-level ECU 300 due to the disconnection of the first connector 120a may be prevented.

For example, the signals output from the ECU-1 to ECU-n should be transmitted to other ECUs. ECUs other than the ECUs for implementing autonomous driving of the vehicle may transmit data to each other to perform control for ordinary driving of the vehicle. Thus, when the disconnection occurs in the bus 130, each of the gateways 201 and 202 may transmit pieces of data of different ECUs among the ECU-1 to ECU-n, which are connected to the first vehicle network domain 101. In other words, communication among the ECU-1 to ECU-n and the high-level ECU 300 is performed not using only one of the two gateways 201 and 202 but using the two gateways 201 and 202.

For example, when the disconnection occurs in the bus 130, the gateways 201 and 202 mutually transmit pieces of data of the ECUs to each other, and each of the gateways 201 and 202 may transmit pieces of data of the ECU-1 to ECU-n received from other gateways to the first vehicle network domain 101. Specifically, the first gateway 201 may transmit signals received from the ECU-1 and the ECU-2 to the second gateway 202, and the second gateway 202 may transmit signals received from the ECUs excluding the ECU-1 and the ECU-2 to the first gateway 201. The second gateway 202 may transmit the signals output from the ECU-1 and the ECU-2 and received from the first gateway 201 to the ECUs excluding the ECU-1 and the ECU-2. The first gateway 201 may transmit signals output from the ECUs excluding the ECU-1 and the ECU-2 and received from the second gateway 202 to the ECU-1 and the ECU-2.

According to an embodiment of the present disclosure, when the disconnection occurs in the bus 130, the signals output from the ECU-1 to ECU-n may be transmitted to the high-level ECU 300 using both of the gateways 201 and 202. In addition, the two gateways 201 and 202 may transmit the signals output from the ECUs, which are received therefrom, to another gateway 201 or 202. Thus, even when the disconnection occurs in the bus 130, normal communication between the ECU-1 to the ECU-n in the first vehicle network domain 101 may be possible.

According to an embodiment of the present disclosure, owing to positions of the two gateways 201 and 202 connected to the first vehicle network domain 101, a problem in that signals output from some of the ECU-1 and the ECU-2 are not transmitted to the high-level ECU 300 due to the break-off of the first connector 120a may be solved.

Figure 5:
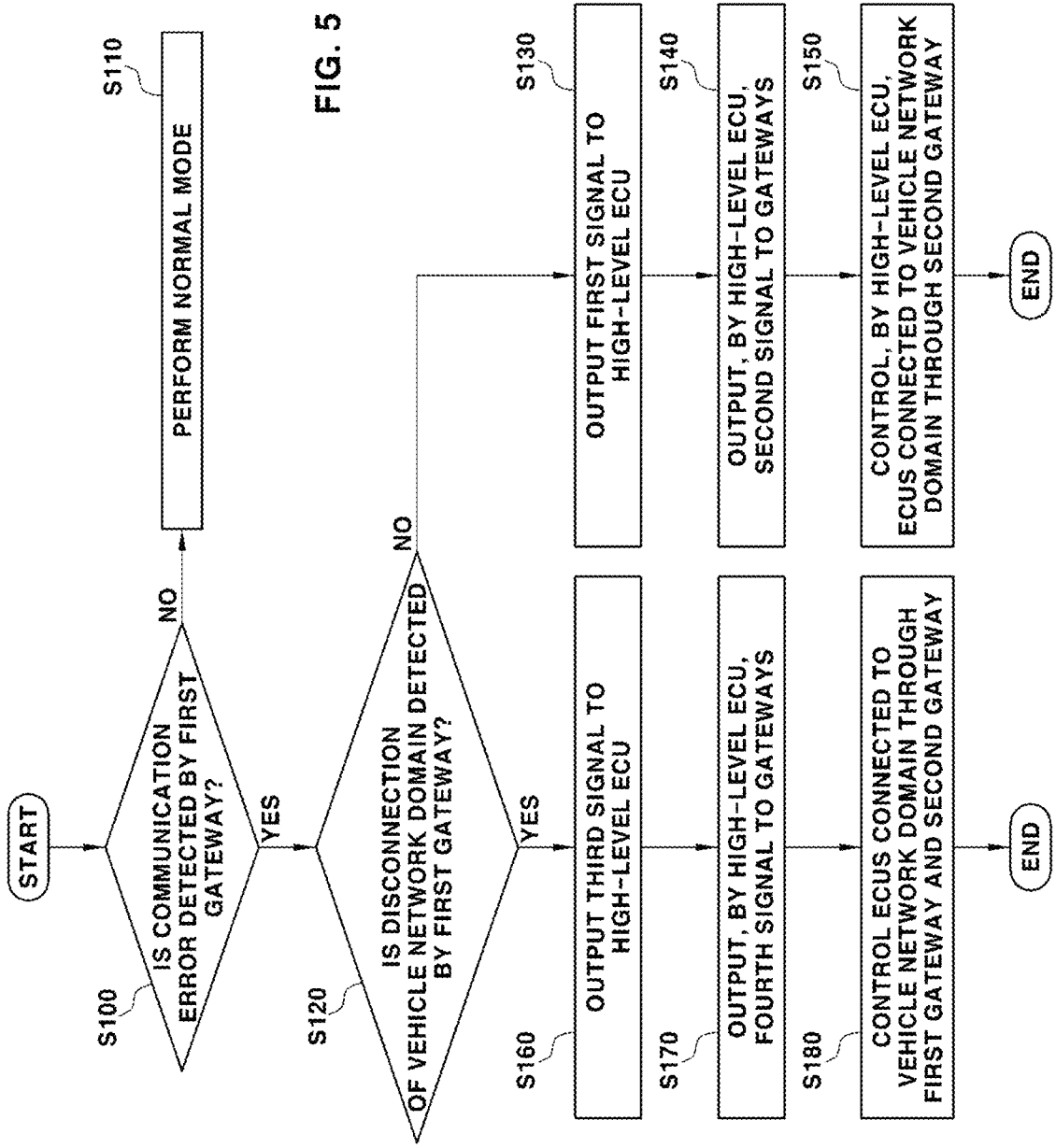
FIG. 5 is a flowchart illustrating a control strategy of the gateway according to the embodiment of the present disclosure.

FIG. 5 is a flowchart illustrating a control strategy of the gateway according to the embodiment of the present disclosure.

Referring to FIGS. 4 and 5, in order to implement redundancy of an autonomous driving system, a case of a communication error is distinguished from a case of disconnection of a bus, and thus a separate control strategy may be applied thereto.

A first gateway may detect whether a communication error occurs. Specifically, a communication ECU of the first gateway may detect an error frame output (a software error of a specific ECU) due to a short circuit of a bus or an error of the specific ECU to determine a communication error (S100).

When the communication error is not detected by the first gateway, communication between ECUs and a high-level ECU may be performed in a normal mode. In this embodiment, the normal mode may mean a mode in which the communication between the ECUs and the high-level ECUs is performed using any one of the first gateway and a second gateway (S110).

When the communication error is detected by the first gateway, the first gateway may detect whether disconnection of a vehicle network domain occurs. The disconnection of the vehicle network domain may mean disconnection of the bus or a break-off of a connector (S120).

When the disconnection of the vehicle network domain is not detected, the first gateway may output a first signal to the high-level ECU. For example, the first signal may be a signal indicating a failure mode in which the first gateway does not route normally due to a communication error thereof (S130).

When the first signal is received from the first gateway, the high-level ECU may output a second signal to the first gateway and the second gateway. For example, the second signal may be a signal for instructing data transmitted from the vehicle network domain to be routed to the high-level ECU through the second gateway in which the communication error does not occur. Thus, the high-level ECU may transmit the second signal to the first gateway and the second gateway or to only the second gateway in which the communication error does not occur (S140).

The high-level ECU may control the ECUs connected to the vehicle network domains through the second gateway. In other words, the high-level ECUs may receive data output from the ECUs through the second gateway and transmit data for controlling the ECUs through the second gateway (S150).

When the first gateway detects disconnection of a domain of the vehicle network, the first gateway may output a third signal to the high-level ECU. The third signal may be a signal indicating a failure mode in which disconnection occurs in the bus of the vehicle network domain. In other words, the third signal may be a signal indicating the disconnection of the bus (S160).

When the third signal is received, the high-level ECU may output a fourth signal to the first and second gateways. The fourth signal may be a signal for instructing the first and second gateways to simultaneously route data received from the vehicle network domain to the high-level ECU and to transmit the data routed between the first and second gateways again to the vehicle network domain. When any one of the first gateway and the second gateway transmits pieces of data received from the ECUs to the high-level ECU, the pieces of data of some of the ECUs may be omitted due to the disconnection of the bus. Thus, the high-level ECU may output the fourth signal that is a signal for instructing the first gateway and the second gateway to simultaneously transmit the pieces of data received from the vehicle network domain to the high-level ECU. According to the output of the fourth signal, the ECUs connected to the vehicle network domain may be controlled through both of the first gateway and the second gateway.

In addition, when the first gateway and the second gateway receive the fourth signal, the pieces of data of the ECUs received by the first gateway may be transmitted to the second gateway, and the pieces of data of the ECUs received by the second gateway may be transmitted to the first gateway. Consequently, data transmission/reception between the ECUs may be implemented (S170 and S180).

Figure 6:
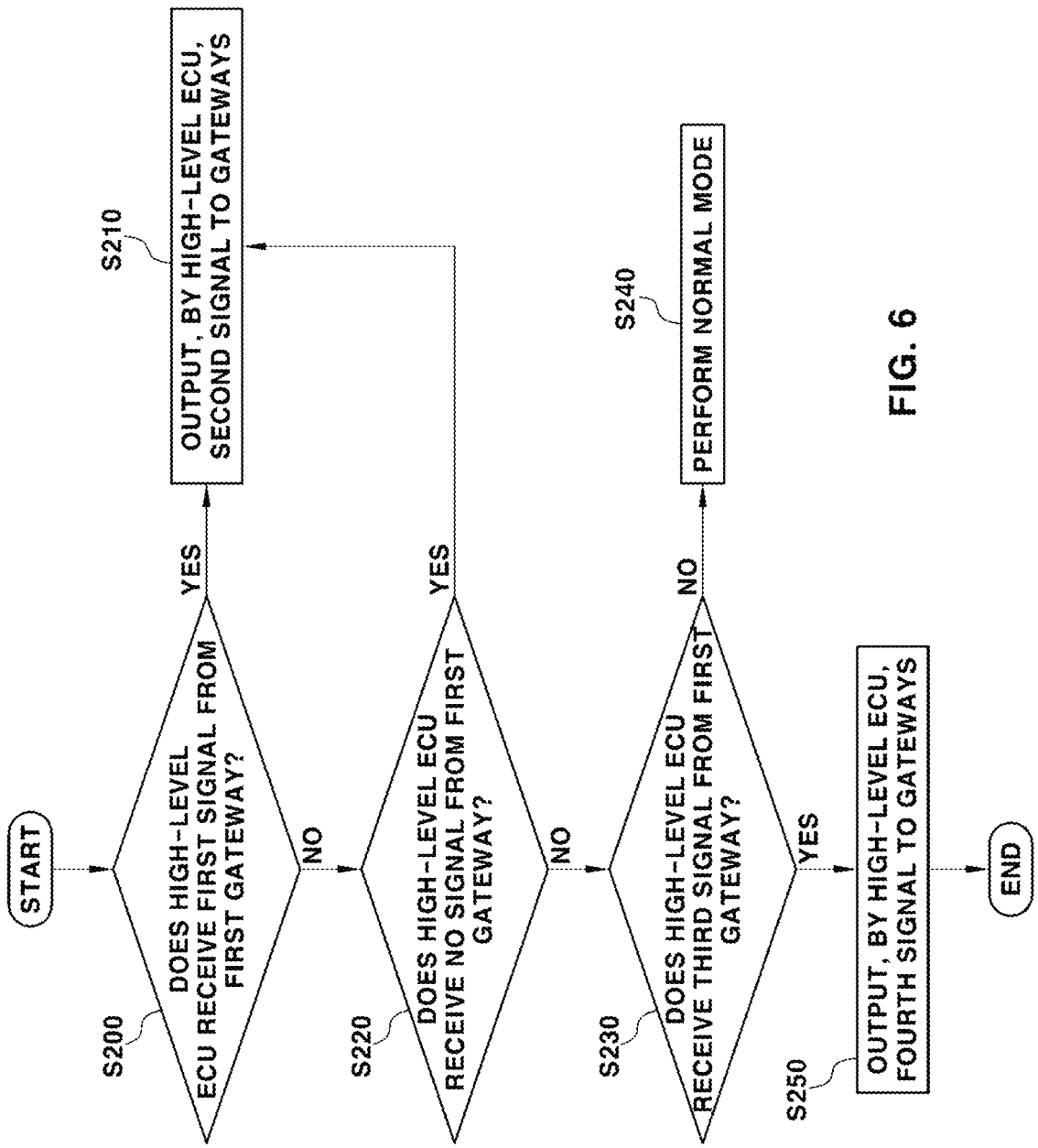
FIG. 6 is a flowchart illustrating a control strategy of a high-level electronic control unit (ECU) according to the embodiment of the present disclosure.

FIG. 6 is a flowchart illustrating a control strategy of the high-level ECU according to the embodiment of the present disclosure.

Referring to FIGS. 4 and 6, the high-level ECU may check whether the first signal is transmitted from the first gateway (S200).

When the first signal is received from the first gateway, the high-level ECU may output the second signal to the first and second gateways (S210).

When the first signal is not received from the first gateway, the high-level ECU may determine whether a signal transmitted from the first gateway is present (S220). When any signal is not transmitted from the first gateway to the high-level ECU, the high-level ECU may output the second signal to the first and second gateways (S210).

When the high-level ECU receives any signal from the first gateway, the high-level ECU may determine that the communication error does not occur. In this case, the high-level ECU may check whether the third signal indicating whether disconnection occurs in the bus is transmitted from the first gateway (S230).

When the high-level ECU does not receive the third signal from the first gateway, it means that both of the communication error and the disconnection of the bus do not occur so that communication between the ECUs and the high-level ECU may be performed in a normal mode (S240).

When the high-level ECU receives the third signal from the first gateway, the high-level ECU may output the fourth signal to the first and second gateways and utilize both of the first gateway and the second gateway so that communication between the ECUs and the high-level ECU may be performed (S250).

In accordance with the embodiments of the present disclosure, when disconnection occurs in a bus, signals output from electronic control units (ECUs) can be transmitted to a high-level ECU using both two gateways. In addition, each of the two gateways can transmit the received signals output from the ECUs to each other. Consequently, even when the disconnection occurs in the bus, normal communication between the ECUs and the high-level ECU can be possible.

In accordance with the embodiments of the present disclosure, owing to positions at which the two gateways are connected to a vehicle network domain, a problem in that signals output from some of the ECUs are not transmitted to the high-level ECU due to a break-off of a connector can be solved.

In accordance with the embodiments of the present disclosure, owing to the positions at which the two gateways are connected to the vehicle network domain, the signals output from the ECUs can be transmitted to other ECUs through data exchange between the two gateways due to the break-off of the connector.

While the embodiments of the present disclosure have been described with reference to the accompanying drawings, a person having ordinary skill in the art to which the present disclosure pertains should understand that the present disclosure can be implemented in other specific form without departing from the technical spirit and essential features of the present disclosure. Therefore, it should be understood that the above-described embodiments are not restrictive but illustrative in all aspects.

What is claimed is:

1. A communication redundancy system for an autonomous vehicle, comprising:
   a vehicle network domain including a bus configured to transmit a signal, terminal end resistors disposed at both ends of the bus, and a plurality of controllers connected to the bus;
   a plurality of gateways connected to the vehicle network domain; and
   a high-level controller connected to the plurality of gateways and configured to control the plurality of controllers to implement autonomous driving of a vehicle, wherein each of the plurality of gateways detects disconnection of the bus in the vehicle network domain and, when the disconnection of the bus is detected, the plurality of gateways transmit pieces of data of the plurality of controllers to the high-level controller, and wherein each of the plurality of gateways is connected to a high line of the bus and a low line of the bus, and each of the plurality of gateways is connected between the terminal end resistor and a controller closest to the terminal end resistor.

2. The communication redundancy system of claim 1, wherein each of the plurality of gateways includes:
a communication controller configured to control a communication signal;
a transceiver connected to the bus including the high line and the low line and configured to transmit signals output from the plurality of controllers to the communication controller; and
a disconnection detector connected to the bus and configured to detect a potential difference between the high line and the low line of the bus.

3. The communication redundancy system of claim 2, wherein:
the vehicle network domain includes a plurality of connectors connected to the bus; and
the communication controller determines disconnection of the plurality of connectors on the basis of the potential difference.

4. The communication redundancy system of claim 2, wherein each of the plurality of gateways further includes a terminal end resistance correction part connected to the bus and configured to compensate for a resistance value, which is varied due to disconnection of the bus.

5. The communication redundancy system of claim 4, wherein, when the disconnection is determined as being occurring in the bus, the communication controller turns the terminal end resistance correction part on.

6. The communication redundancy system of claim 5, wherein:
the terminal end resistance correction part includes a switch and a compensation resistor; and
when the disconnection occurs in the bus, the communication controller turns the switch on to connect the compensation resistor to the bus.

7. The communication redundancy system of claim 6, wherein the compensation resistor has a resistance value equal to that of the terminal end resistor.

8. The communication redundancy system of claim 1, wherein:
when the disconnection occurs in the bus, the plurality of gateways mutually transmit pieces of data of the controllers, which are received by the plurality of gateways; and
each of the plurality of gateways transmits the pieces of data of the controllers, which are received from the remaining gateways, to the vehicle network domain.

9. The communication redundancy system of claim 1, wherein:
the plurality of gateways include a first gateway and a second gateway;

when a communication error of the first gateway is detected, the first gateway transmits a first signal to the high-level controller; and
the first signal includes a signal indicating a failure mode in which the first gateway does not route the first signal normally due to the communication error of the first gateway.

10. The communication redundancy system of claim 9, wherein:
when the first signal is received, the high-level controller transmits a second signal to the first gateway and the second gateway; and
the second signal includes a signal for instructing data transmitted from the vehicle network domain to be routed to the high-level controller through the second gateway in which the communication error does not occur.

11. The communication redundancy system of claim 10, wherein, when any signal including the first signal is not received from the first gateway, the high-level controller transmits the second signal to the first gateway and the second gateway.

12. The communication redundancy system of claim 1, wherein:
the plurality of gateways include a first gateway and a second gateway;
when the disconnection of the bus of the vehicle network domain is detected, the first gateway transmits a third signal to the high-level controller; and
the third signal includes a signal indicating a failure mode in which the disconnection occurs in the bus of the vehicle network domain.

13. The communication redundancy system of claim 12, wherein:
when the third signal is received, the high-level controller transmits a fourth signal to the first gateway and the second gateway; and
the fourth signal includes a signal for instructing the first and second gateways to simultaneously route data received from the vehicle network domain to the high-level controller and to transmit the data routed between the first and second gateways again to the vehicle network domain.

14. The communication redundancy system of claim 13, wherein, when the disconnection occurs in the bus, each of the first gateway and the second gateway routes a signal for controlling different controllers.

15. The communication redundancy system of claim 12, wherein:
the data received by each of the first gateway and the second gateway includes pieces of data output from different controllers; and
the first gateway and the second gateway mutually transmit the pieces of data received by each of the first gateway and the second gateway, and each of the first gateway and the second gateway transmits the pieces of data, which are received from a counterpart of the first gateway or the second gateway, to the vehicle network domain.

* * * * *